United States Patent
Haran et al.

(10) Patent No.: US 10,045,201 B2
(45) Date of Patent: Aug. 7, 2018

(54) INTER-NETWORK OPERATOR ROAMING POLICY CONFIGURATION IN MOBILE WIRELESS DATA NETWORKS OPERATED BY COOPERATING NETWORK SERVICE PROVIDERS

(71) Applicant: United States Cellular Corporation, Chicago, IL (US)

(72) Inventors: Narayanan Haran, Hoffman Estates, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 180 days.

(21) Appl. No.: 15/236,009

(22) Filed: Aug. 12, 2016

(65) Prior Publication Data
US 2018/0049019 A1    Feb. 15, 2018

(51) Int. Cl.
*H04W 8/02* (2009.01)
*H04W 8/12* (2009.01)
*H04W 72/04* (2009.01)
*H04L 5/00* (2006.01)

(52) U.S. Cl.
CPC .............. *H04W 8/12* (2013.01); *H04L 5/0055* (2013.01); *H04W 72/0493* (2013.01)

(58) Field of Classification Search
CPC .............. H04W 8/12; H04W 8/02; H04L 5/00
USPC ........................................................ 455/433
See application file for complete search history.

(56) References Cited

U.S. PATENT DOCUMENTS

| | | | | |
|---|---|---|---|---|
| 2012/0185578 | A1* | 7/2012 | Perkuhn | H04W 8/06 709/223 |
| 2015/0365929 | A1* | 12/2015 | Gu | H04W 8/20 455/450 |
| 2016/0373588 | A1* | 12/2016 | Raleigh | H04M 15/61 |

* cited by examiner

Primary Examiner — Kamran Afshar
Assistant Examiner — Farideh Madani
(74) Attorney, Agent, or Firm — Leydig, Voit & Mayer, Ltd.

(57) ABSTRACT

A method carried out by communications between a home roaming configuration server and a visited roaming configuration server is described that facilitates configuring roaming handling by the visited operator wireless data network for home operator user equipment affiliated with the home operator mobile wireless data network. The home roaming configuration server issues, via a secure transmission path connecting the home operator network and the visited operator network, a configuration command specifying a configuration command affecting handling of roaming operation of user equipment of the home operator by the visited operator. The visited roaming configuration server executes the configuration command to render a new roaming configuration for the visited operator wireless data network handling of roaming wireless data network service usage by the home operator user equipment. The visited roaming configuration server, via the secure transmission path, acknowledges the new roaming configuration for the visited operator wireless data network.

19 Claims, 7 Drawing Sheets

US 10,045,201 B2

INTER-NETWORK OPERATOR ROAMING POLICY CONFIGURATION IN MOBILE WIRELESS DATA NETWORKS OPERATED BY COOPERATING NETWORK SERVICE PROVIDERS

FIELD OF THE INVENTION

This invention relates generally to the field of mobile wireless communications networks and related services. More particularly, the invention is directed to application server-based roaming policy configuration support between network operators.

BACKGROUND OF THE INVENTION

Over the years mobile wireless communications service provider have been able to extend the geographic reach of their mobile wireless services for customers through the use of roaming service coverage arising from partnership agreements between mobiles wireless network service providers having non-overlapping service coverage areas. Network operator partnership agreements and the resulting roaming service availability ensure high availability of mobile wireless communications services regardless of whether a user is within geographic territory of a home mobile wireless data network operator/service provider.

Generally speaking, roaming agreements are memorialized in a written contract document. Thereafter, the terms of the roaming service/partnership agreement are translated to computational logic configurations incorporated/programmed into network roaming service provider management nodes within a mobile wireless data network provider connectivity access networks (CANs). By way of example, such configuration is maintained and applied by a policy and charging rules function (PCRF) operating on a node within a partner provider's CAN.

SUMMARY OF THE INVENTION

Embodiments of the invention are used to provide a method, non-transitory computer readable medium, and a computer system for handling changes to roaming agreements between partner network operators supporting a roaming arrangement. The ability to configure roaming terms into roaming partner policy and charging rules functional node opens up a variety of new roaming terms and manners of implementing roaming support pursuant to potentially complex and dynamic roaming service arrangements.

In particular, a method carried out by communications between a home roaming configuration server within a home operator mobile wireless data network and a visited roaming configuration server within a visited operator wireless data network is described. The method facilitates configuring roaming handling by the visited operator wireless data network for home operator user equipment affiliated with the home operator mobile wireless data network.

In particular, the method comprises issuing, by the home roaming configuration server via a secure transmission path that connects the home operator network and the visited operator network, a configuration command specifying a configuration command affecting handling of roaming operation of user equipment of the home operator by the visited operator. Thereafter, the visited roaming configuration server executes the configuration command to render a new roaming configuration for the visited operator wireless data network handling of roaming wireless data network service usage by the home operator user equipment. The visited roaming configuration server issues, via the secure transmission path, a configuration acknowledgment message confirming the new roaming configuration for the visited operator wireless data network.

The invention is embodied in computer-executable instructions stored on a non-transitory computer readable medium facilitating carrying out the steps of the above-summarized method. The invention is further embodied in a networked node including a processor and computer-readable medium configured to carry out the steps of the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

In general, after two (i.e. home/visited) mobile wireless network operators enter a roaming usage agreement for a home operator's user equipment using a visited operator's wireless data network services of the visited operator's, the terms of the agreement are applied to logic maintained and applied by policy/rules engines executed on network usage management nodes, including home/visited roaming configuration servers, in the operators' respective wireless access networks. Exemplary implementations of roaming policy/rules reconfiguration described herein address challenges of maintaining up-to-date roaming policies consistent with highly dynamic roaming policy/rule specification/enforcement environments. The roaming configuration infrastructure described herein opens a variety of new ways to support highly adaptive roaming rules, policies, access, etc. For this reason, an exemplary operating environment is described. Exemplary roaming configuration operations, comprising messages/transactions between roaming configuration servers of wireless network operator partners is described. Thereafter, multiple examples of new roaming configuration-enabled services are described that leverage the described roaming configuration structures and operations.

The examples provided herein utilize DIAMETER protocol-based connection initiation. The DIAMETER protocol is used to carry out: authentication, authorization, and accounting (AAA); policy application; and implement resource management. However, the principles of the present invention are not limited to the well known DIAMETER protocol. A roaming configuration service/node is introduced at both home and visited operator networks that communicates via DIAMETER (routing and edge) agents with policy and charging rules functions to process potentially high volumes of new roaming configurations arising from new roaming agreements and new user statuses requiring modification of current roaming rules and policies implemented by the policy and charging rules functions at one or more home/visited operator mobile wireless networks.

Figure 1:
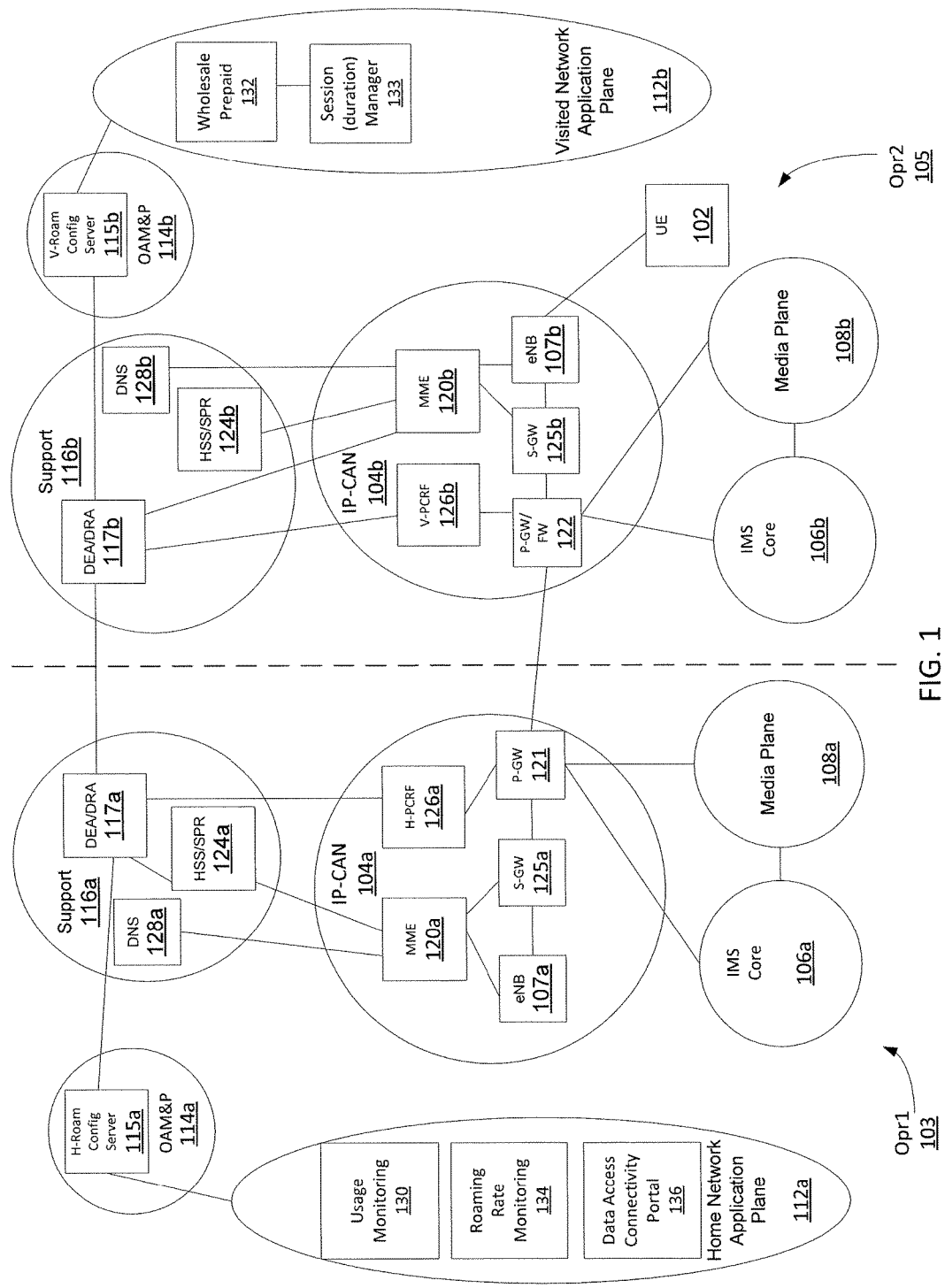
FIG. 1 is a schematic diagram illustrating a mobile wireless communications network environment.

Turning to FIG. 1, an exemplary (LTE) network environment is schematically depicted that includes monitoring and management components facilitating support of LTE voice calls and data connections from a user equipment (OS-UE) 102. In the illustrative example, the user equipment is associated with a user subscription in a home wireless network 103 (also referenced herein as Opr1) and is currently connected via a visited network eNodeB 107*b* to a roaming wireless network 105 (also referred to herein at Opr2) having a roaming wireless operator services usage agreement with the home wireless network 103.

The processing components in the exemplary LTE networks (Opr1 103 and Opr2 105) depicted in FIG. 1 are logically grouped in six categories. An LTE access plane 104*a/b*, also referred to as an IP connectivity access network (IP-CAN) and more generally a radio access network (RAN), includes E-UTRAN and EPC components of the LTE network. The LTE access plane 104*a/b* provides IP connectivity between the OS-UE 102 and various structural/functional components of an LTE mobile wireless network.

With continued reference to the grouped categories depicted in FIG. 1, an Internet Protocol multimedia subsystem (IMS) core 106*a/b*, of known makeup and design, comprises signaling components involved in setting up a call/connection.

A media plane 108*a/b* comprises structural components involved with building and maintaining a bearer path between the respective LTE networks 103 and 105 and other IP multimedia subsystem networks supported by other network service providers.

An application plane 112*a/b* comprises structural components supporting features for voice and messaging calls. The application plane 112*a/b*, described further herein below, includes various application servers, including a set of application servers that leverage the roaming configuration capabilities of home and visited mobile wireless operator networks described herein.

An operational alarm management and provisioning (OAM&P) plane 114*a/b* comprises a set of components carrying out "operational alarm management and provisioning" components of the LTE network environment 100. Notably, the OAM&P plane 114*a* includes a home roaming configuration server 115*a* that operates as a source of initiation, reception, and processing of inter-operator network roaming configuration messages in accordance with the structures and operations described herein below relating to the inter-operation of home and visited roaming configuration servers incorporated within respective operator networks 103 and 105. On a visited mobile wireless operator network (Opr2) 103, a visited roaming configuration server 115*b* operates as a recipient of initiation, sending, and processing of inter-operator network roaming configuration messages in accordance with the structures and operations described herein below relating to inter-operation of the home and visited roaming configuration servers 115*a/b*.

A support plane 116*a/b* comprises a set of servers configured to carry out various wireless data network multimedia services support functions relating to: databases, routing and call charging. The Support Plane 116*a/b* includes a Diameter Edge Agent/Diameter Routing Agent 117*a/b* that operates as a relay point between home and visited network roaming configuration server nodes 115*a/b*. The home/visited roam configuration server 115*a* supports a configuration (Cg) interface for requesting a roaming configuration and changing an existing configuration. The roaming configuration (Cg) interface is described herein below with reference to FIGS. 2 and 3.

Below is a description of additional sub-elements contained within the above generally described six categories of logical entities that provide services within the exemplary LTE data network environment schematically depicted in FIG. 1.

LTE Access Plane 104 *a/b*

The LTE access plane 104*a/b* comprises a mobility management entity (MME) 102*a/b*: The MME is a control-node for the LTE access-network. The MME 120*a/b* is responsible for idle mode UE (User Equipment) paging and tagging procedure including retransmissions. The MME 120*a/b* is involved in bearer activation/deactivation processes and choosing a serving gateway (SGW) 125*a/b* for a UE at an initial attachment stage and at a time of an intra-LTE handover involving a Core Network (CN) node relocation. The MME 120*a/b* authenticates the user equipment (by interacting with a home subscriber server (HSS) 124*a/b* of the support plane 116*a/b*). The Non Access Stratum (NAS) signaling terminates at the MME 120*a/b* and it is also responsible for generating and allocating temporary identities to UEs. The MME 120*a/b* checks the authorization of the UE to camp on the service provider's Public Land Mobile Network (PLMN) and enforces UE roaming restrictions. The MME 120*a/b* is the termination point in the network for ciphering/integrity protection for NAS signaling and handles security key management. Lawful interception of signaling is also supported by the MME 120*a/b*. The MME 120*a/b* also terminates an S6a interface towards the home HSS 124*a* for roaming UEs such as the UE 102 in FIG. 1.

Serving Gateway (SGW): The SGW (e.g. SGW 125*a/b*) routes and forwards user data packets, while also acting as the mobility anchor for the user plane during inter-eNodeB handovers and as the anchor for mobility between LTE and other 3GPP technologies (by terminating point of an S4 interface and a relaying point of traffic between 2G/3G systems and a PGW such as PGW 121). For idle state UEs, the SGW terminates the downlink data path and triggers paging when downlink data arrives for the UE. The SGW manages and stores UE contexts, e.g. parameters of the IP bearer service, network internal routing information. The SGW also performs replication of the user traffic in case of lawful interception.

Packet Data Network Gateway (PGW and PDN Gateway): The PGW (e.g. PGW 121 and PGW/FW 122) provides connectivity from a UE to external packet data networks by being the point of exit and entry of traffic for the UE in a connected mobile wireless data network. UE may have simultaneous connectivity with more than one PGW for accessing multiple PDNs. The PGW performs policy enforcement, packet filtering for each user, charging support, lawful interception and packet screening. Another role of the PGW is to act as the anchor for mobility between 3GPP and non-3GPP technologies such as WiMAX and 3GPP2 (CDMA 1× and EvDO).

Policy and Charging Rules Function (PCRF): The PCRF (e.g. H-PCRF 126a and V-PCRF 126b), in illustrative examples, store and apply the terms of roaming service/partnership agreements entered between wireless data network service operators (e.g. Opr1 and Opr2). Roaming service agreements between operators are converted into computational logic configurations incorporated/programmed into network roaming service provider management nodes within a mobile wireless data network provider connectivity access networks (CANs). By way of example, such configurations are maintained and applied by home/visited policy and charging rules functions (e.g. H-PCRF 126a and V-PCRF 126b) operating on a node within LTE access planes of respective home/visited wireless data networks (e.g. IP-CAN 104a and IP-CAN 104b).

Support Plane 116a/b

Home subscriber server (HSS): The HSS (e.g. HSS/SPR 124a/b) is a central database that contains user-related and subscription-related information. The functions of the HSS include functionalities such as mobility management, call and session establishment support, user authentication and access authorization. The HSS is based on pre-Rel-4 Home Location Register (HLR) and Authentication Center (AuC).

DIAMETER Edge Agent/DIAMETER Routing Agent (DEA/DRA): The DEA/DRA (e.g. DEA/DRA 117a/b) support secure message transmissions, associated with roaming user sessions and associated billing, between the home (e.g. Opr1) and visited (e.g. Opr2) networks using a well-defined message structure.

Domain Naming Service: The DNS 128a/b translates URL-based names into IP addresses according to, for example, a SIP addressing scheme. The DNS 128a/b may incorporate ENUM which is an IETF standard (RFC 2916) for mapping the public telephone number space into the Domain Name System (DNS) address space.

IMS Core 106a/b

The IMS Core 106a/b includes a Proxy Call Session Control Function (P-CSCF). The P-CSCF is a first contact point within the IMS Core 106a/b during call connection initiation. The P-CSCF operates as a SIP proxy by forwarding, for example, SIP messages between the UE 102 and the IMS Core 106b. The P-CSCF also maintains security associations between the P-CSCF and the UE 102. The P-CSCF incorporates an Application Function aspect of a Policy and Charging Control (PCC) by authorizing bearer service resources and performing QoS management.

The IMS Core 106a/b further includes an Interrogating/Serving Call Session Control Function (I/S-CSCF) that includes both "interrogating" and "serving" parts. The interrogating part of the I/S-CSCF functions as a contact point within an operator's network for UE requests. Upon receiving an IMS registration request, the "interrogating" part of the I/S-CSCF determines a serving call session control function (S-CSCF) in a terminating-side network to which the registration request is to be routed. For registration requests identifying another mobile wireless device as the terminating point for a voice call, the interrogating part of the I/S-CSCF queries the home subscriber server (HSS) 124a/b of the support plane 116a/b to determine the identity of an S-CSCF upon which the requesting UE 102 is registered.

The "serving" part of the I/S-CSCF supports voice call sessions by performing session set-up, session tear-down, session control and routing functions. The serving part of the I/S-CSCF invokes applications supported by servers associated with the Application Plane 112a/b based on an initial filter criteria received from the HSS 124a/b. The serving part of the I/S-CSCF operates as a SIP registrar for the UE 102 that originated the VoLTE call. The serving part of the I/S-CSCF queries the HSS 124a/b for applicable mobile wireless service subscriber/UE profiles and handles calls involving the corresponding user equipment once they have been registered. The serving part of the I/S-CSCF accesses subscription information to determine appropriate forwarding/routing of VoLTE call connection set up requests originating through the I/S-CSCF.

A Breakout Gateway Control Function (BGCF) processes requests for routing from the serving part of the I/S-CSCF for cases were the I/S-CSCF determines the session cannot be routed using the DNS 128a/b. The DNS 128a/b translates URL-based names into IP addresses according to, for example, a SIP addressing scheme. The DNS 128a/b may incorporate ENUM which is an IETF standard (RFC 2916) for mapping the public telephone number space into the Domain Name System (DNS) address space. The BGCF determines a next hop for routing a SIP invite message. This determination may be based on a variety of information including information: received in the protocol, administrative information, and/or database access. For public switch telephone network (PSTN) terminations, the BGCF determines a network in which PSTN/CS domain breakout is to occur. If the routing determination is such that a breakout is to occur in a same mobile wireless service provider network in which the BGCF is located, then the BGCF selects a media gateway control function (MGCF) responsible for interworking with the PSTN/CS domain. If the routing determination results in a break out in another mobile wireless service provider network, the BGCF forwards session signaling to another BGCF in the other network. If the routing determination results in the session being destined for termination in another IMS network, then the BGCF forwards the message to an I/S-CSCF in the other IMS network.

A Media Resource Function (MRF) comprises a Multimedia Resource Function Controller (MRFC) in the IMS Core 106a/b and a Multimedia Resource Function Processor (MRFP) in the media plane 108a/b. The MRFC controls media stream resources in the MRFP. The MRFC interprets information coming from an application server (AS) in the Application plane 112a/b and the I/S-CSCF (e.g. session identifier) and controls the MRFP accordingly. The MRFP, of the Media plane 108a/b, provides a variety of service support functions including: multimedia transcoding, multiparty multimedia mixing, network announcements/tones, and floor control for managing access rights to shared resources in a conferencing environment.

The MGCF of the IMS core 106a/b supports control plane interworking between the IMS core 106a/b and a legacy circuit network. By way of specific example, the MGCF executes protocol mapping between SIP and ISUP call control protocols. The ISUP protocol supports signaling for providing voice and non-voice services in telephone communications. ISUP is an extension of SS7, used as the interface protocol for voice and data within, and for ingression or egression to/from, the Public Switched Telephone Network (PSTN.). The MGCF also controls a Media Gateway node according to, for example, the H.248 protocol.

An Interconnection Border Control Function (IBCF) in the IMS core 106a/b and a Transition Gateway (TrGW) in the media plane 108 manage control/media plane functionality at a point of connection to another network.

Media Plane 108a/b

The media plane 108a/b comprises a Media Gateway (MGW) that supports user plane interworking between the IMS core 106a/b and legacy circuit network bearers.

Application Plane 112a/b

Turning attention to the Application plane 112a/b for home (Opr1) and visited (Opr2) operators, a variety of supporting application servers are contemplated in association with various roaming configuration applications described herein below with reference to FIGS. 4, 5 and 6.

A usage monitoring server 130 of Opr1 103 operates in a home side of a home/visited set of operator wireless data networks. The usage monitoring server 130, described in substantial detail herein below, interfaces with various sources of monitored usage information and renders appropriate aggregated/filtered (content as well as usage rate) information to the home roaming configuration server 115a to facilitate the functionality described herein below with reference to FIG. 4.

On the visited/roaming operator side, the Opr2 105 includes a wholesale prepaid server 132 that tracks and publishes a variety of roaming usage information relating to a currently configured prepaid roaming usage agreement entered between Opr1 103 and Opr2 105. A session duration manager 133 coordinates operation with a wholesale prepaid roaming usage agreement, executed/enforced on the Opr 2 by the wholesale prepaid server 132, to limit duration of roaming user equipment of Opr1 connected to the wireless data network of Opr2.

On the home roaming operator side, the Opr1 103 includes a roaming rate monitoring server 134 that provides information to the home roaming configuration server 115a in association with the rate-based configuration decision-making carried out by the home roaming configuration server 115a that is described herein with reference to FIG. 5B.

A data access connectivity portal 136 is configured to provide portal functionality with regard to external clients seeking access to data contained on the user equipment 102 via firewall control commands issued by the home roaming configuration server 115a to the roaming PGW/FW 122 of the Opr2 while supporting a roaming connection for the user equipment 102.

The system schematically depicted in FIG. 1 generally, with the exception of the home/visited configuration servers 115a/b and the identified application servers of the application planes 112a/b, depicts known LTE mobile wireless network entities. Thus, the above description is meant to be summary in nature—as opposed to being exhaustive—since the described elements are generally well known in the mobile wireless communications field.

Moreover, it is emphasized that the visited network (Opr2) may be any of a variety of wireless data network service provider types. Therefore, in addition to mobile wireless, the wireless network may be a WiFi/WiMax wireless provider or any other wireless data network service provider type (including future wireless network types). Moreover, while LTE is described as the illustrative mobile wireless technology in FIG. 1, alternative mobile wireless technologies are contemplated such as CDMA, GSM, USTS, etc. as well as future mobile wireless technologies.

Figure 2A:
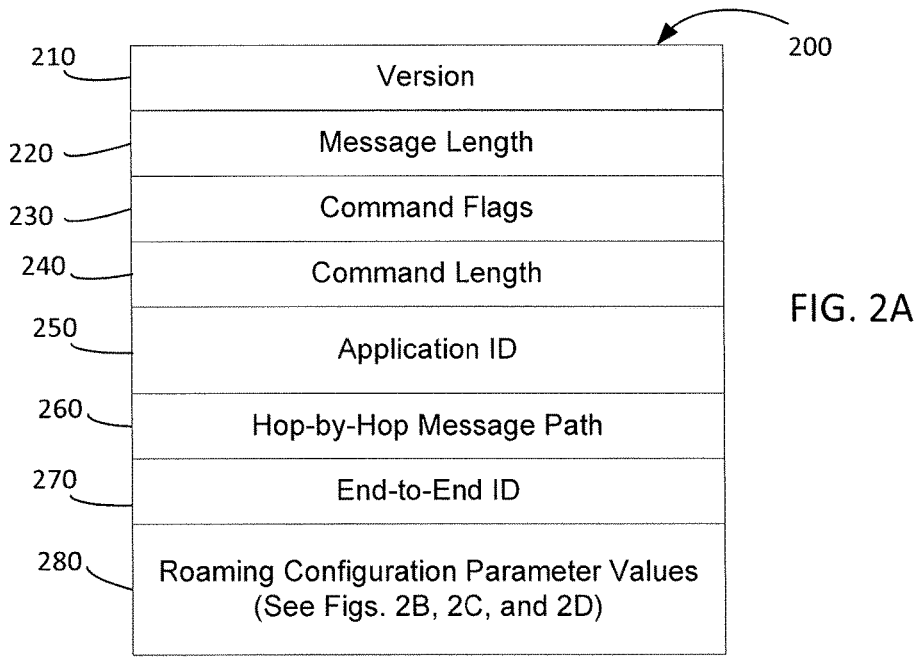
FIG. 2A is a message format for a configuration message issued by a home roaming network configuration application server to a visited roaming network configuration application server.
Figure 3:
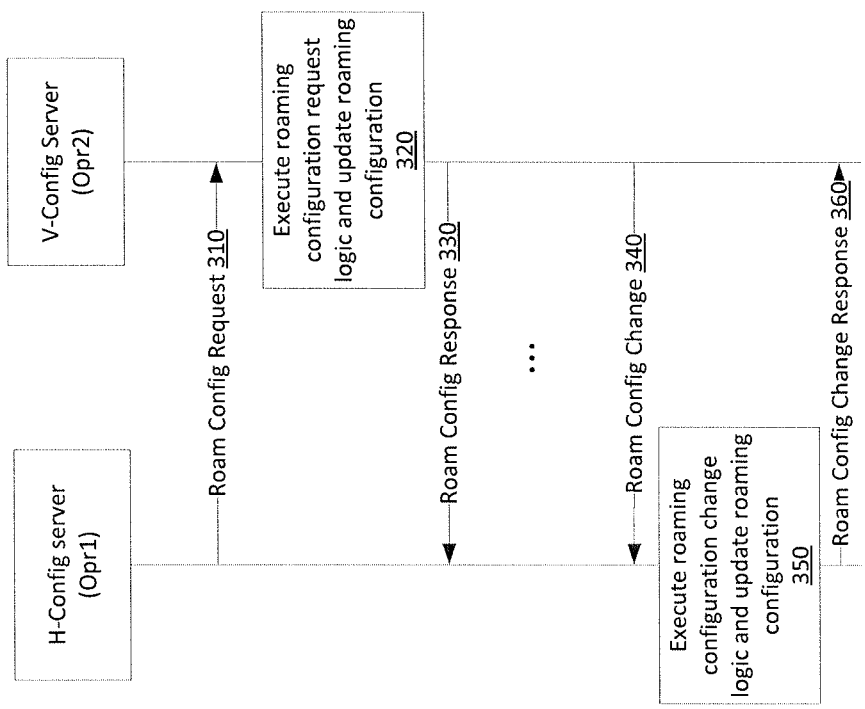
FIG. 3 is a sequence diagram depicting process flow for a set of transactions in accordance with establishing a new roaming configuration at a visited wireless roaming network.

Having described exemplary structural/functional elements of an exemplary LTE network suitable for carrying out exemplary implementations of roaming configuration messaging, reference is now made to an exemplary configuration message structure in FIG. 2A and several sequence diagrams summarizing operation of a system incorporating highly configurable roaming relationships between cooperating mobile wireless network operators. In FIG. 3, a series of message transactions and operations depict two types of roaming configuration operations supported by the system depicted in FIG. 1. Thereafter, FIGS. 4-6 depict series of operations associated with three distinct applications of the reconfiguration-server implemented roaming reconfiguration capabilities described with reference to FIG. 3.

Turning to FIG. 2A, a set of fields are depicted for an exemplary configuration message 200 format. A version 210 specifies a particular format (version) used to encode the content of the configuration message. A message length 220 identifies the total length of the message, which is necessitated by the variable length of message a consequence of various types of information conveyed in case-specific operations described herein below with reference to FIGS. 4-6. A command flags 230 includes a set of bits specifying various conditional/Boolean flags specifying, for example: change notification, acknowledgment, command set/reset state (see blocking status in association with FIG. 5, etc. A Command length 240 identifies the length of the command portion of the message. An Application ID 250 specifies a unique identification of the application that issued the message for purposes of identifying the proper source of a request for purposes of designating a recipient of a response message. A hop-by-hop message path 260 specifies a set of nodes through which the message passed from the source to recipient. An end-to-end ID 270 specifies the source/destination nodes for the message (reversed by the recipient to generate a response message). The end-to-end ID 270 thus identifies the home/visited operators that are affected by the configuration command.

A roaming configuration 280 specifies a set of parameter values for: specifying a roaming configuration command, and/or confirming a new/modified roaming configuration. In an exemplary embodiment, the roaming configuration 280 comprises a roaming command and a set of parameter type identification-value pairs associated with the particular roaming configuration command. As such, the set of configurable parameters and associated values is extensible and further "versionable" (as a consequence of the ability to identify a version of the message structure in the version 210. Examples of parameters passed in the roaming configuration 280 include: UE device identification groups (e.g. IMSI value ranges for affected user equipment, requested return codes for acknowledging successful/unsuccessful completion of a requested configuration change on the visited network (e.g., Opr2).

Figure 2B:
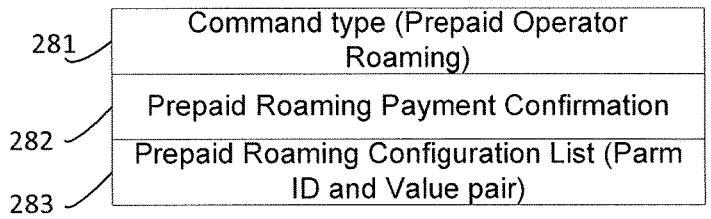
FIGS. 2B, 2C and 2D provide exemplary sets of parameter values for application-specific examples of the extensible/versionable content of the roaming configuration structure of FIG. 2A.
Figure 2C:
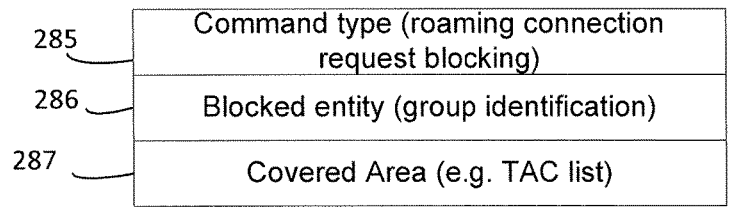
Figure 2D:
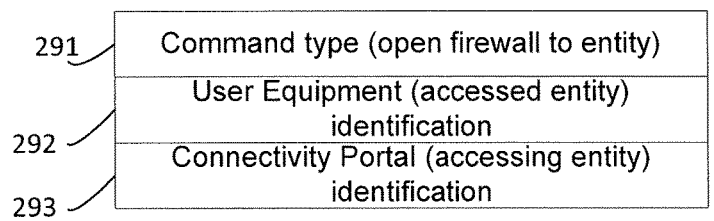

Turning to FIGS. 2B, 2C and 2D, application-specific examples of the extensible/versionable content of the roaming configuration 280 contents are identified. Turning to FIG. 2B, a command type (prepaid operator roaming) 281 identifies the particular type of command that has been issued and operates as an instruction for the visited roaming configuration server 115*b* to use a particular configuration script when processing the received roaming configuration request. A Prepaid Roaming Payment Confirmation 282 specifies a transaction identification providing proof that the current configuration request (and the resulting configuration of roaming by Opr1 equipment on Opr2) is covered by an appropriate monetary transfer (or the Opr1 has sufficient credit on-hand to support the requested new confirmation for Opr1 user equipment using Opr2 wireless data network services. A prepaid roaming configuration list 283 contains a variable length set of configurable prepaid roaming usage limit/unit identifications and requested new values (or changes from current values).

Turning to FIG. 2C, a command type (blocking) 285 identifies the command as one to implement blocking on an specified group of user equipment identified in an entity identification 286. A covered area 287 specifies the extent of the blocking. As noted below in the discussion of FIG. 5, the area of coverage may be defined in a variety of ways including, by way of example, specifying a list of traffic area codes (TACs) where blocking on the specified entities is to occur. The parameter list for specifying a blocking command may further include a duration for the requested blocking of connection requests—after which the blocking will cease by the Opr2 on Opr1 user equipment requests to open a roaming data network connection.

Turning to FIG. 2D, a command type (open firewall) 291 identifies the command as one to implement opening a firewall on the visited network to facilitate client access to a roaming user equipment (e.g. UE 102 associated with Opr1) identified via an accessed entity identification 292 (e.g. MEID) on the visited wireless network (e.g., Opr 2). An accessing entity identification 293 specifies an identification and potentially authentication information for the party that will be permitted to access data stored on the entity identified in the accessed entity identification 292. The parameter list for specifying a firewall opening command may further include a duration for the requested opening of the firewall to the external access—after which the firewall will block access requests by the entity identified in the accessing entity identification field 293.

Figure 4:
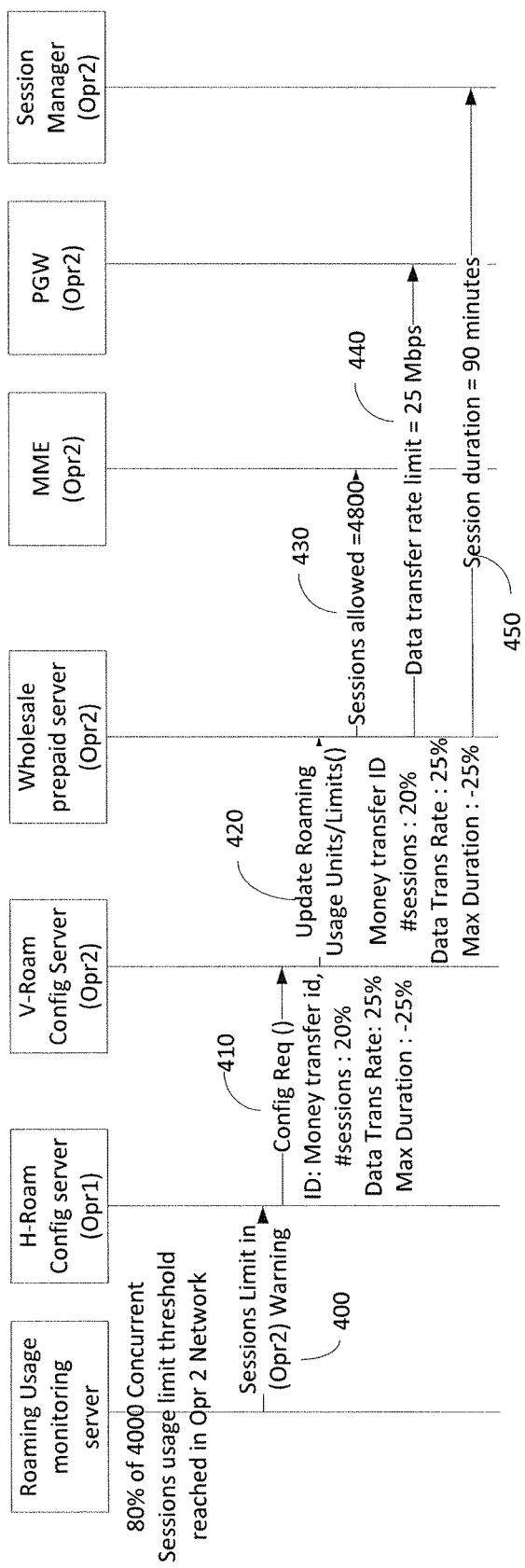
FIG. 4 is a sequence diagram depicting process flow for a set of transactions in accordance with a first application (wholesale prepaid) of dynamic configuration capabilities facilitated by the roaming configuration arrangement described herein with reference to FIGS. 1, 2 and 3.
Figure 5:
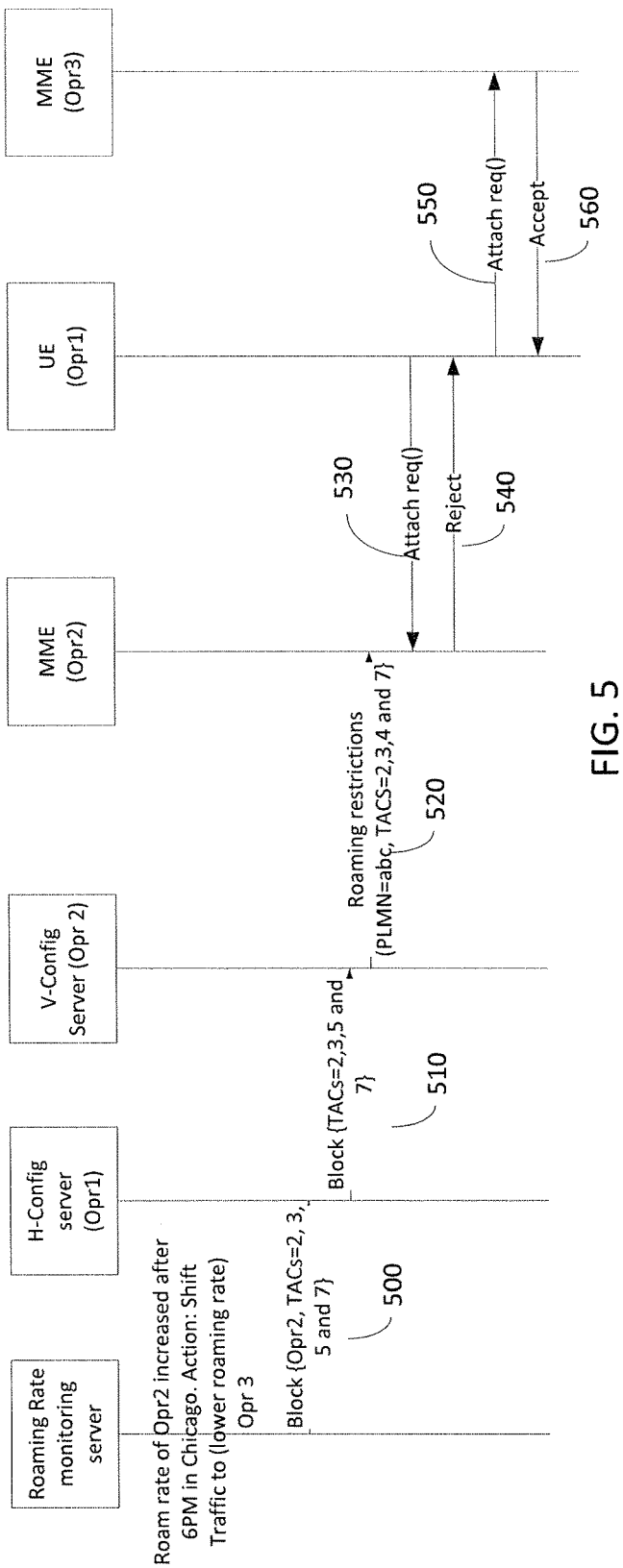
FIG. 5 is a sequence diagram depicting process flow for a set of transactions in accordance with a second application (dynamic roaming control) of dynamic configuration capabilities facilitated by the roaming configuration arrangement described herein with reference to FIGS. 1, 2 and 3.
Figure 6:
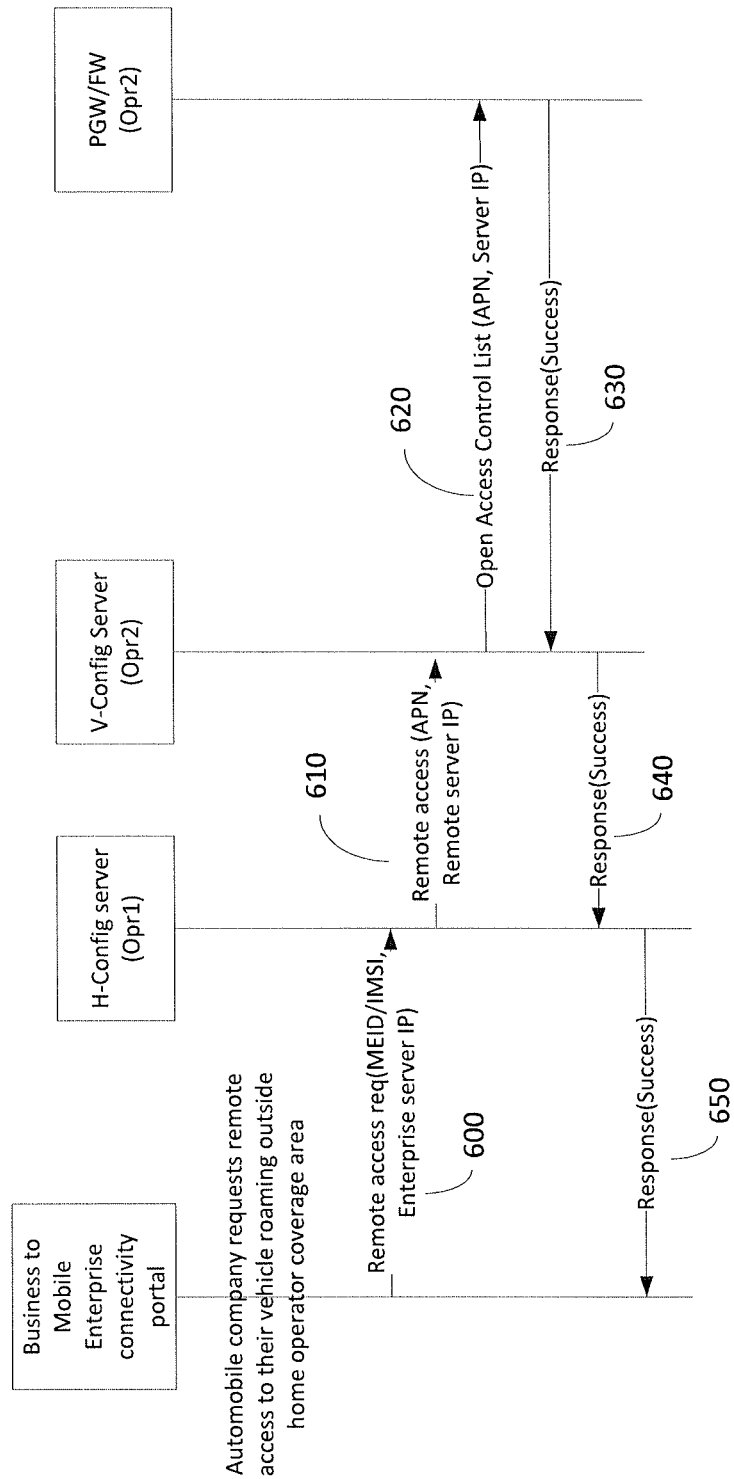
FIG. 6 is a sequence diagram depicting process flow for a set of transactions in accordance with a third application (prime integrator) of dynamic configuration capabilities facilitated by the roaming configuration arrangement described herein with reference to FIGS. 1, 2 and 3.

Having described exemplary message structures with reference to FIG. 2A-D, attention is directed to FIGS. 3-6 that provide examples of various methods carried out by the networked nodes depicted in FIG. 1 to carry out configuration of roaming policies through the use of inter-operator roaming configuration request/response messaging between home/visitor roaming configuration servers for two distinct wireless network operators. In the examples the home roaming configuration server is associated with a mobile wireless data network operator 1 (Opr1), and the visited roaming configuration server is associated with a wireless data network operator 2 (Opr2). In each of the sequence diagrams, intermediate message transport nodes, through which roaming configuration messages pass on a path connecting the home and visited roaming configuration servers, are not shown in the figures to simplify the drawing and related description. Initially, FIG. 3 depicts a sequence diagram summarizes a basic set of roaming configuration operations/communications relating to roaming policies carried out between the home roaming configuration server 115*a* for Opr1 and the visited roaming configuration server 115*b* for Opr2. Thereafter FIGS. 4-6 depict additional functional components and operations that carry out particular examples of enhanced roaming configuration facilitated by the home/visited roaming configuration servers through messaging facilitating roaming configurations that are highly adaptive/responsive to short-term (hourly or even within minutes) changes to observed roaming conditions.

Turning to FIG. 3, during 310, the home roam configuration server issues a Roam-Configuration-Request message (see FIG. 2A) to the visited roam configuration server. The Roam-Configuration-Request message specifies a new roaming configuration for an identified entity (e.g., individual/group of mobile wireless service subscribers). The Roam-Configuration-Request (e.g. roaming configuration parameter values 280), by way of example, specifies: User/Group ID (e.g. PLMN identification, International Mobile Subscriber "IMSI" identification range, etc.), EMM cause-codes replacement values for either network failures or administrative blocks, a roaming relationship identification (e.g. PS, PS&CS, VoLTE-S8HR), charge codes, etc.

In response to receiving the Roam-Configuration-Request message, during 320 the visited roam configuration server executes processing logic on the received roam configuration request. Such processing includes: (1) verifying authenticity/authorization of the Roam-Configuration-Request message, and (2) conditionally (e.g. upon verifying permissions and validity of configuration terms) incorporating the specified roaming configuration parameter values in the received configuration message into the roaming configuration policy and charging rules. By way of example, the visited roam configuration server determines whether a roaming configuration is allowed for the identified roaming entity (e.g., a group ID). Thereafter, the visited roam configuration server uses the authenticated and authorized roaming terms specified for example in field 280 of a request message from the home roaming configuration server 115*a* to the roaming configuration server 115*b*, to configure policies (e.g. home policies or local policies) carried out by various components of the visited wireless network. Incorporation/rejection of roaming terms proposed in the Roam-Configuration-Request message is recorded in a results structure generated by the visited roam configuration server during 320.

Thereafter, during 330, the visited roam configuration server issues a Roam-Configuration-Response message to a home roam configuration server. The Roam-Configuration-Response message (in the form of the configuration message depicted in FIG. 2A and described above) confirms success/failure of an update of the roam configuration at the visited roam configuration server in accordance with a previously received Roam-Configuration-Request issued by the home roam configuration server. Such notification of success/failure is provided via the above-mentioned results structure generated by the visited configuration server during 320. In particular, the results structure of the Roam-Configuration-Response, by way of example, specifies a listing/description of policies set by the visited roam configuration server in accordance with the received Roam-Configuration-Request call/message from the home roam configuration server.

While not shown in the drawing, if the response issued by the visited roam configuration server during 330 is not a complete acceptance/incorporation of the requested roaming configuration terms contained in the request issued during 310, then the home roam configuration server may generate further requests responsive to the rejected terms of the initial/previous roaming configuration request message issued during 310.

Independently of the above-described home roam configuration server-initiated configuration request operation sequence, a change to an existing roaming configuration is initiated by the visited roam configuration server. With continued reference to FIG. 3, in response to a change in a monitored parameter affecting a current roaming configuration or a change in roaming support policies/rules at the visited roam configuration server (e.g., certain roaming policies of the home mobile wireless network are no longer supported by the visited mobile wireless network), during 340 the visited roam configuration server issues a Roam-Configuration-Change notification message to a home roam configuration server. The Roam-Configuration-Change notification message identifies any changes to a roaming policy/rule associated with the home roam configuration server that arose from monitored conditions at the visited roam configuration server. The Roam-Configuration-Change notification, by way of example, specifies a listing/description of policies set by the visited roam configuration server in accordance with the received Roam-Configuration-Request call/message from the home roam configuration server.

In response to receiving the Roam-Configuration-Change notification message, during 340 the home roam configuration server issues a Roam-Configuration-Change-Response message to a visited roam configuration server. The Roam-Configuration-Change-Response message specifies acceptance/rejection of any roaming policy/rules changes previously identified in the Roam-Configuration-Change notification message issued by the visited roam configuration server during 330.

Implementation of a wholesale prepaid roaming wireless data network agreement is a first example of active/responsive roaming data network usage configuration through coordinated operation of home/visited roaming configuration servers (e.g. home/visited roaming configuration servers 115a and 115b). In the prepaid roaming scenario, the Opr1 establishes a wholesale prepaid arrangement with the Opr2 to provide roaming data network services to roaming user equipment affiliated with Opr1. Such agreement may include limits on concurrently consumed wireless data network resources by the Opr1 user equipment, limits on service levels for particular user classes (e.g., throttling of lower service classes), and allocated usage units (e.g., total sessions, total data transferred, total session minutes, etc.). The agreement further specifies amounts to be paid for various usage units/limits. By way of a simple example, Opr1 may contract with Opr2 to provide, on a prepaid basis, 100 hours of roaming wireless data network services for roaming user equipment affiliated with Opr1. However, after a period of time, the 1000 prepaid hours of roaming wireless data network access on Opr2 will reach a near zero level—at which point the Opr2 will reject access requests by user equipment affiliated with Opr1.

Turning to FIG. 4, a sequence diagram summarizes a series of operations and associated messaging transactions for sensing a current level of available/remaining wholesale prepaid roaming wireless data network resources on Opr2 and triggering a set of automated operations for the home roaming configuration server 115a to issue command messages to the visited roaming configuration server 115b to configure the visited roaming wireless data network capacity parameters associated with Opr1 to ensure uninterrupted roaming access to user equipment affiliated with the Opr1. The issued command messages include, by way of example, roaming usage unit/limit parameters. The roaming usage unit/limit parameters include newly prepaid purchased amounts for usage units/limits on aggregated roaming data network services on a visited operator mobile wireless network (Opr2) for user equipment associated with subscribers to a home operator mobile wireless data network (Opr 1). "Usage units", by way of example include, on an aggregated roaming user basis, total: number of initiated user sessions, quantity of transferred data, duration of user sessions, etc. "Usage limits", by way of example include, on an aggregated roaming user basis: bandwidth allocated to concurrent users, concurrent user sessions, etc.

The type/quantity of aggregated roaming user data services is not of particular importance. Instead, it is important that, based upon the sensed aggregated wireless data network service usage/needs of roaming users, the home roaming configuration server 115a for Opr1 commences operations to change a level of prepaid current roaming data services in the visited operator wireless data network (Opr2). Thus, for a currently sensed prepaid wholesale roaming data service usage level/limit, the home roaming configuration server 115a executes logic, responsive to the sensed roaming data service usage level/limit, to conditionally trigger issuing a message (request/command) to the visited roaming configuration server 115b to change a level of prepaid wholesale data service usage on Opr2 available to roaming Opr1 user equipment.

Prior to commencing execution of the sequence of operations depicted in FIG. 4, the home (Opr1) and visited (Opr2) network operators execute a wholesale usage agreement. The prepaid wholesale roaming services data usage agreement specifies terms relating: (1) particular compensation amounts, and (2) corresponding aggregated roaming data services usage units/limits on the Opr2 network for roaming user equipment associated with Opr1. Moreover, the roaming terms can be specified at various levels of granularities including: UE types, subscriber class/type, user/subscription lists (groups), individual users, network type (e.g. LTE, CDMA), etc.

The roaming agreement terms are not of primary concern, as there are a wide variety of potential agreement terms relating prepaid costs to specified units/limits for roaming data services usage by roaming user equipment. Instead, an underlying unifying aspect of the roaming wireless data network usage agreement structure is the presence of executable logic specifying conditionally triggered actions by the home roaming configuration server 115a to issue a command to the visited roaming configuration server 115b to alter current roaming usage terms for Opr1 roaming user equipment on the wireless data network of Opr2. Executable logic on the home roaming configuration server 115a applies current operating conditions to the terms of the network usage agreement structure. If the executable logic determines that a change to current roaming data services usage units/limits is needed for roaming UE devices on the visited network of Opr2, then the home roaming configuration server 115a issues a roaming configuration change request to the visited roaming configuration server 115b to initiate changes to current roaming data services usage units/limits on the wireless data network of Opr2.

Thus, after an initial setup (resulting in an initialized configuration of the visited network roaming policy) the home network roaming configuration server 115a continuously applies current conditions affecting roaming data services usage units/limits observed/enforced by Opr2 on roaming UE devices associated with Opr1. Once triggered by a status change and determination that a new level of wholesale prepaid roaming data services usage units/limits is needed, the home network roaming configuration server 115a issues a configuration command to the visited network roaming configuration server 115b. The visited network roaming configuration server 115b thereafter carries out the requested configuration command by issuing corresponding instructions to support nodes in the visited operator wireless data network. Thus, while roaming data services usage units/limits and corresponding compensation amounts are defined by an initial wholesale prepaid roaming agreement between Opr1 and Opr2, subsequent changes to the roaming data services usage units/levels on the visited network roaming configuration server 115b are initiated by commands issued by the home network roaming configuration server 115a.

With specific reference to FIG. 4, the roaming usage monitoring server 130 monitors a configurable set of roaming usage unit/limit parameter values indicative of remaining prepaid roaming data network usage capacity on Opr2 (e.g. total roaming service data usage, concurrent roaming sessions, etc.). In response to one or more of the monitored usage unit/limit parameter values reaching a configured notification triggering level, during 400 the roaming usage monitoring server 130 issues a notification message to the home roaming configuration server 115a. By way of example, the notification message includes at least: the roaming network operator (e.g., Opr2), the parameter name (e.g., concurrent user sessions), a current usage units/limit (e.g. 4000 concurrent user sessions), and a current value (e.g. 90% of usage limit) that resulted in issuance of the notification message indicative of a need to purchase additional prepaid roaming data services usage capacity on the identified roaming network.

With continued reference to FIG. 4, in response to receiving the notification message from the roaming usage monitoring server 130, during 410 the home roaming configuration server 115a, configured with executable programmed logic for determining new usage units/limits in response to threshold warnings such as the one received during 400, executes the programmed logic to determine appropriate new usage units/limits for roaming users on the Opr2 network. By way of example, during 410 executable logic on the home roaming server 115a increases the concurrent roaming user sessions by 20 percent (e.g., from 4000 to 4800) in response to the notification the concurrent user sessions on Opr2 reached 90 percent of the current maximum permitted concurrent user sessions (e.g. 3600 of 4000). The home roaming configuration server 115a also takes the opportunity to set new levels for other roaming data network service sessions for Opr1 user equipment on the Opr2 network. For example, a maximum data transfer rate is increased 25 percent (e.g. 20 Mbps to 25 Mbps), and the maximum session duration is decreased 25 percent (e.g. 120 minutes to 90 minutes). Additionally, during 410, upon completion of executing the programmed logic on the home roaming configuration server 115a, the rendered new concurrent user session parameters are packaged and sent in a configuration request message to the visited roaming configuration server 115b. The new usage units/limits can be specified in a variety of ways. While new values are specified in the form of change percentages from current existing values (e.g. add 20 percent to current limit for concurrent sessions) are specified in the above example, in other cases the new values are specified in the form of adding/subtracting a quantity (e.g. add 400 concurrent user sessions) or a new value itself (e.g. 4800 concurrent users).

Additionally, during 410 the home roaming configuration server 115a may also include a payment transaction identification in the configuration request message. The payment transaction identification aids verification by the visited roaming configuration server 115b that the new roaming services usage levels on Opr2 have been prepaid by Opr1.

Thereafter, during 420 the visited roaming configuration server 115b verifies authenticity of the received configuration request message. The visited roaming configuration server 115b issues an update roaming usage units/limits message to the wholesale prepaid server 132. By way of example, the update roaming usage units/limits message includes the contents of the previously received configuration request message from the home roaming configuration server. Thus, according to the exemplary reconfiguration message, the update message to the wholesale prepaid server 132 specifies: the money transfer ID, concurrent sessions limit increased 20 percent, data transfer rate increased 25 percent, and maximum session duration decreased 25 percent.

In the illustrative example, the wholesale prepaid server 132 is configured with programmed instructions (e.g. conditionally executed scripts) that process the contents of the update roaming usage units/limits message and issues one or more messages to various regulatory nodes in the Opr 2 network that monitor/enforce the specified roaming data network usage units/limits (in this case limits) specified in the update message. Thus, in accordance with the illustrative example, during 430 the wholesale prepaid server 132 issues a command to the MME 120b to change the quantity of permitted concurrent roaming sessions for Opr1 user equipment devices to 4800 (an increase of 20 percent from the previous level of 4000). During 440 the wholesale prepaid server 132 issues a command to the PGW/FW 122 to change the data transfer rate for Opr1 user equipment devices to 25 Mbps (an increase of 25 percent from the previous level of 20 Mbps). During 450 the wholesale prepaid server 132 issues a command to the session duration manager 133 to change the maximum duration for roaming user sessions for Opr1 user equipment devices to 90 minutes (a decrease of 25 percent from the previous level of 120 minutes).

The above examples discussed with reference to FIG. 4 are illustrative in nature, and a wide variety of changed roaming configuration parameters are contemplated. For example, while the above-described example is directed to usage limits. In other cases the configuration messages specify new values for usage units such as total data transfers, session minutes, sessions, etc.

Turning to FIG. 5, another example of the wide variety of roaming management services supported by coordinated operation of the home roaming configuration server 115a and the visited roaming configuration server 115b relates to managing selection of particular ones of multiple available roaming data network operators without changing preferred roaming lists maintained on the individual user equipment of Opr1. Such functionality enables the home operator (Opr1) to quickly, and without human intervention, detect a change in a best available roaming rate offered by one of multiple available operators available in a particular area. For example, Opr2 may offer lower roaming rate for most of the day in a particular area, but increases the roaming rate in the early afternoon (e.g. from 2-7 pm) to a value that exceeds a roaming rate offered by Opr3 in the same area during that time period. However, the preferred roaming lists of Opr1 user equipment statically rank Opr2 over Opr3. It would be desirable to cause the Opr1 user equipment to connect to Opr3 instead of Opr2 during the time period when the roaming rates of Opr3 are less than the rates of Opr2.

With specific reference to FIG. 5, the roaming rate monitoring server 134 monitors current roaming rates for various operators (e.g. Opr2 and Opr3). Such roaming rates can be highly variable and changes during the course of a single day. In such case, roaming rate monitoring logic on the roaming rate monitoring server 134 is configured to detect changes to the roaming operators providing the best rates in a particular regions. In response to such detection, the roaming rate monitoring server 134 determines whether the roaming operator offering the best roaming rates in a particular area is also the highest ranked operator on the Opr1 user equipment preferred roaming list (PRL). If the operator currently offering the best roaming rates in the particular area is not the highest ranked operator on the PRL, then the roaming monitoring server 134 issues a notification to the home roaming configuration server 115a indicating a need to block connection requests for all operators in the given area that are ranked higher than the operator currently offering the best roaming rates to the Opr1 user equipment.

By way of the illustrative example in FIG. 5, the roaming rate monitoring server 134 maintains an up-to-date record of: (1) PRLs for Opr1 user equipment, and (2) current roaming rates of the operators listed in the PRLs. Based upon such records, the roaming rate monitoring server 134 detects that the current roaming rate for a highest ranked operator (e.g. Opr2) for an identified user area. currently exceeds the current roaming rate offered by a lower ranked operator (e.g. Opr3) on the PRLs for Opr1 user equipment. Such identified user area is specified, by way of example, through a listing of traffic area codes (e.g. TACs 2, 3, 5 and 7). Other geospatial designations are contemplated such as geo-fence descriptions, base station identifications, logical/verbal descriptions of an area, etc.

In response to the detected change, which results in the lower ranked Opr3 offering better roaming rates than the higher ranked Opr2, during 500 the roaming rate monitoring server 134 issues a session block notification message to the home roaming configuration server 115a. By way of example, the session block notification message includes at least: the roaming network operator (e.g., Opr2) that will block session requests from Opr1 user equipment, and the affected area (e.g., TACs 2, 3, 5 and 7). Additionally, the session block notification message may specify a duration for the current blocking instruction to be enforced by the roaming network operator before returning to a non-blocked state).

With continued reference to FIG. 5, in response to receiving the session block notification message from the roaming usage monitoring server 130, during 510 the home roaming configuration server 115a, which may be configured with executable programmed logic for verifying/confirming the desirability of changing the blocking status of the identified operator (e.g. Opr 2), packages the information received during 500 into a configuration request message containing a blocking command and sends the configuration request message to the visited roaming configuration server 115b. The blocking command parameters can be specified in a variety of ways. In the illustrative example, the command parameter specifies a change in blocking status for an identified operator (Opr2) for Opr1 user equipment. The request may further include a time duration/period through which the blocking command remains active. This further parameter eliminates a need for the home roaming configuration server to issue a follow-up command to release the block request on Opr2 when the roaming rate offered by Opr2 again becomes favorable (e.g. at 7 pm) to the currently favorable Opr3 roaming rate.

Thereafter, during 520 the visited roaming configuration server 115b verifies authenticity of the blocking command parameters within the received configuration request message. The visited roaming configuration server 115b issues a roaming restriction message to the Opr2 mobility management entity. By way of example, the roaming restriction message identifies: a PLMN and TACs (2, 3, 4 and 7). More generally, the roaming restriction message specifies at least: (1) the user equipment to be blocked from initiating sessions, and (2) the areas of blocking.

With continued reference to FIG. 5, during 530 the Opr1 user equipments issues an attach request to the Opr2 MME, and during 540 the Opr2 MME (now configured to block session requests from Opr1 user equipment) issues a reject response to the Opr1 user equipment. Thereafter, during 550 the Opr1 user equipment issues, based upon the Opr1 user equipment PRL, an attach request to the Opr3 MME. The Opr3 MME accepts the attach request during 560 and the Opr1 user equipment commences a session on the Opr3 wireless data network at the currently more favorable roaming rates than the roaming rates currently offered by Opr2.

The above example of using session blocking to temporarily re-arrange roaming operator preferences without changing PRLs on user equipment is merely illustrative in nature, and a wide variety of messaging arrangements, coordinated by the home roaming configuration server 115a and the visited roaming configuration server 115b are contemplated.

Referring to FIG. 6, yet another example, of the wide variety of roaming management services supported by coordinated operation of the home roaming configuration server 115a and the visited roaming configuration server 115b, relates to managing firewall protections of roaming user equipment to facilitate emergency access to necessary information on the roaming user equipment currently being served by another wireless data network service operator.

Mobile wireless data network operators play a role of prime integrator of mobility services for a variety of businesses providing services via mobile wireless data network connections. For example, a home operator (Opr1) network supports remote access for an automobile company to various data stored on an automobile data memory. When the automobile breaks down while travelling outside the coverage area served by the home operator (Opr1), attempts to access the data on the automobile data memory may be blocked by a firewall on the roaming network served by another operator (Opr2) that is configured to protect the automobile from such intrusions via the mobile wireless interface of the automobile's telematics unit. Thus, in accordance with the example described herein with reference to FIG. 6, when the automobile company attempts to access the automobile data memory via the roaming mobile wireless network operator (Opr2), a configuration request is issued to the home roaming configuration server 115a to initiate operations resulting in opening the firewall on the roaming network (Opr2) to allow the automobile remote mobile wireless access to the automobile data memory. A further configuration request is issued to subsequently close the roaming network firewall access previously granted to the automobile company.

In the illustrative example, a vehicle having a telematics unit including embedded user equipment of Opr1 has broken down while located in an area not served by Opr1. However, the area is served by a wireless data network service operator (e.g. Opr2) having a roaming agreement with Opr1. An existing firewall on the packet data network gateway of the roaming data network service operator (e.g. Opr2) prevents access by an external requesting entity (e.g. the automobile telematics service provider) into the data stored on automobile data memory that is accessible via the roaming Opr 1 user equipment. In such case, the home roaming configuration server 115a, acting as a trusted agent for the Opr1 network, cooperatively operates with the visited roaming configuration server 115b to temporarily open access via the Opr2 firewall to the external requesting entity.

With specific reference to FIG. 6, during 600 the home roaming configuration server 115a for Opr1 receives a remote access request via the data access connectivity portal 136 indicating a need to access to data via identified user equipment that is currently located in an area served by a roaming partner operator (Opr2). In the illustrative example, the remote access request includes the following identification information: (1) MEID, IMSI, and request entity ID (e.g. IP address).

In response to receiving the remote access request, during 610 the home roaming configuration server 115a, which may be configured with executable programmed logic for verifying/confirming the desirability of permitting the requested remote access based upon provided identification and authentication information, issues a configuration request message, which includes an embedded remote access request command, to the visited roaming configuration server 115b. In the illustrative example, the remote access request command includes: (1) an APN, (2) a remote server IP address (of the entity requesting access via the roaming network firewall), and (3) authentication information. However, the remote access request parameters can be specified in a variety of alternative ways Thereafter, during 620 the visited roaming configuration server 115b verifies authenticity of the remote access request command parameters within the received configuration request message. The visited roaming configuration server 115b issues an open access control list command message including the information contained in the received remote access request command from the home roaming configuration server 115a. Thus, at this point, the Opr 2 PGW/FW is configured to allow access for a period of time (before the firewall is again closed) by the entity (identified by IP address) that initially requested access to the roaming Opr1 user equipment. A variety of ways for identifying user equipment are contemplated. For example, a group of user equipment for the Opr1 are identified by an IP pool assigned to a particular enterprise. Other identification types include IMSI and mobile equipment identifications.

With continued reference to FIG. 6, during 630 (assuming successful authentication and completion of the requested opening of the firewall to the identified entity) the packet data network gateway 122 on the roaming operator (Opr2) issues a "success" response to the visited roaming configuration server 115b indicating that the requesting entity now has access to the Opr1 user equipment identified in the original remote access request. During 640, a success response is issued by the visited roaming configuration server 115b to the home roaming configuration server 115a. During 650 the home roaming configuration server 115a passes a response message back to the data access connectivity portal 136.

Thus, in summary of the above exemplary wireless data network service roaming configuration operations described above with reference to FIGS. 3-6, in response to a triggering condition, the home network roaming configuration server 115a for Opr1 issues a roaming configuration message to the visited network roaming configuration server 115b. The roaming configuration message specifies a configuration command that causes the visited network roaming configuration server 115b for Opr2 to process the received command. In processing the configuration command the visited network roaming configuration server 115b issues messages to one or more functional nodes on the visited wireless network of Opr2 to modify handling of wireless data network services provided by Opr2 to UE devices associated with Opr1.

Having described a roaming configuration server supported roaming configuration operation, as well as particular new roaming management arrangements facilitated by the roaming configuration server based configuration of roaming policies and rules on partner mobile wireless networks, it is emphasized that the proposed configuration arrangement and usage cases are exemplary in nature. Notably additional/alternative roaming configuration messaging arrangements are contemplated to handle alternative mobile wireless network environments and roaming service arrangements. Moreover, various systems support a roaming configuration server/service enabling users to specify a particular one of the supported roaming modes on an individual user equipment basis.

Moreover, while described in the context of LTE, the described roaming configuration support structure and associated operation of home/visited roaming configuration servers are applicable to virtually any wireless data network where roaming is supported by a home wireless network for associated user equipment to operate on visited networks in accordance with roaming agreement terms.

Figure 7:
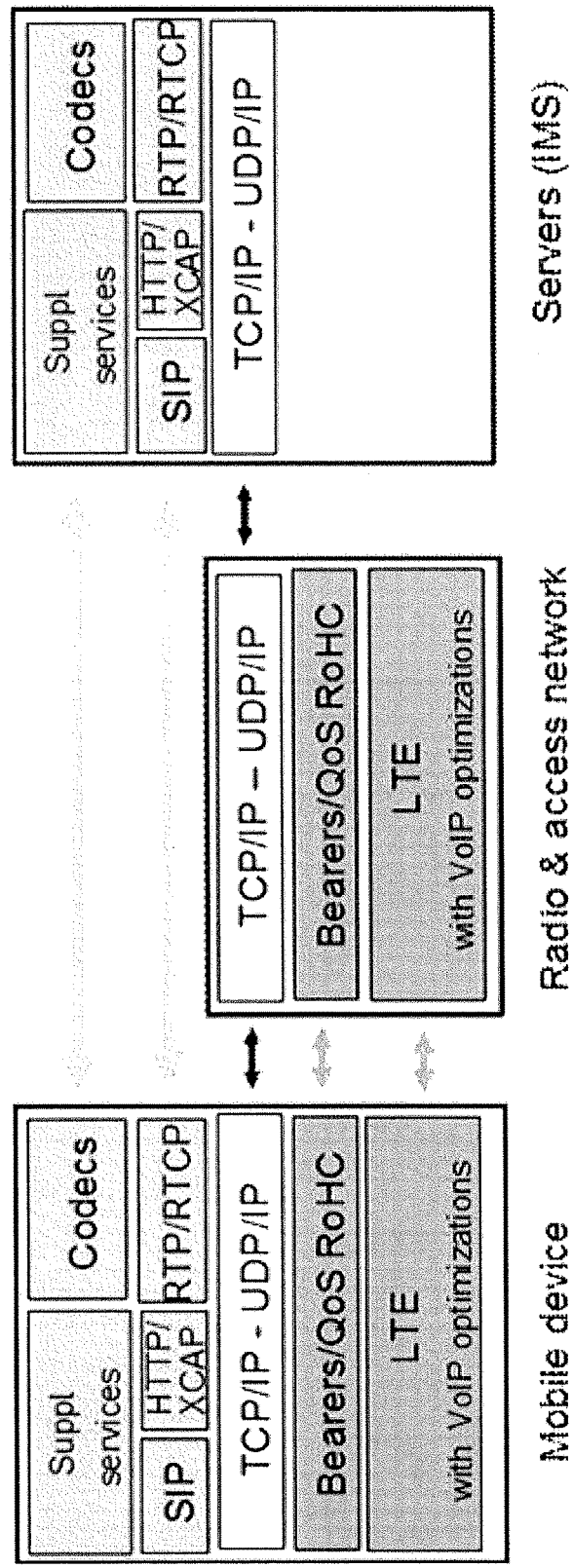
FIG. 7 is an exemplary set of protocol stacks utilized by: user equipment (mobile wireless device), a radio access network, and servers connected to the radio access network and user equipment.

Turning to FIG. 7, an exemplary set of protocol stacks are schematically depicted for the originating user equipment 102, the radio access network (e.g., IP-CAN 104), and the IMS core 106 servers. The various layers and components are standard components and therefore the individual components of the various layers/components are not described herein as they would be well known to those skilled in the art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by communications between a home roaming configuration server within a home operator mobile wireless data network and a visited roaming configuration server within a visited operator mobile wireless data network, for configuring roaming handling by the visited operator mobile wireless data network for home operator user equipment affiliated with the home operator mobile wireless data network, the method comprising:

issuing, by the home roaming configuration server via a secure transmission path that connects the home operator mobile wireless data network and the visited operator mobile wireless data network, a configuration command specifying a configuration command affecting handling of roaming operation of user equipment of the home operator mobile wireless data network by the visited operator mobile wireless data network;

executing, by the visited roaming configuration server, the configuration command to render a new roaming configuration for the visited operator mobile wireless data network handling of roaming wireless data network service usage by the home operator user equipment; and issuing, by the visited roaming configuration server via the secure transmission path, a configuration acknowledgment message confirming the new roaming configuration for the visited operator mobile wireless data network.

2. The method of claim 1 wherein the configuration command comprises a wholesale prepaid roaming configuration command that modifies one or more roaming wireless data network usage agreement terms for home operator user equipment.

3. The method of claim 2 wherein the roaming wireless data network usage agreement terms include a limit on concurrent use of the visited operator mobile wireless data network by home operator user equipment.

4. The method of claim 2 wherein the roaming wireless data network usage agreement terms include a limit on data transfer rate during use of the visited operator mobile wireless data network by home operator user equipment.

5. The method of claim 2 wherein the roaming wireless data network usage agreement terms include a limit on session duration during use of the visited operator mobile wireless data network by home operator user equipment.

6. The method of claim 1 wherein the configuration command comprises a blocking command to block connection requests on the visited operator mobile wireless data network by home operator user equipment.

7. The method of claim 1 wherein the configuration command comprises a firewall command to open a firewall on the visited operator mobile wireless data network that enables access by an identified requesting entity to data stored on an identified home operator user equipment.

8. A non-transitory computer-readable medium including computer-executable instructions for carrying out a method for configuring roaming handling by a visited wireless data network by user equipment affiliated with a home operator mobile wireless data network, the method comprising:

issuing, by the home roaming configuration server via a secure transmission path that connects the home operator mobile wireless data network and the visited operator mobile network, a configuration command specifying a configuration command affecting handling of roaming operation of user equipment of the home operator mobile wireless data network by the visited operator mobile wireless data network;

executing, by the visited roaming configuration server, the configuration command to render a new roaming configuration for the visited operator mobile wireless data network handling of roaming wireless data network service usage by the home operator user equipment; and issuing, by the visited roaming configuration server via the secure transmission path, a configuration acknowledgment message confirming the new roaming configuration for the visited operator mobile wireless data network.

9. The non-transitory computer-readable medium of claim 8 wherein the configuration command comprises a wholesale prepaid roaming configuration command that modifies one or more roaming wireless data network usage agreement terms for home operator user equipment.

10. The non-transitory computer-readable medium of claim 8 wherein the configuration command comprises a blocking command to block connection requests on the visited operator mobile wireless data network by home operator user equipment.

11. The non-transitory computer-readable medium of claim 8 wherein the configuration command comprises a firewall command to open a firewall on the visited operator mobile wireless data network that enables access by an identified requesting entity to data stored on an identified home operator user equipment.

12. A mobile wireless data network server node configured to operate as a home operator roaming configuration server for a home mobile wireless data network operator, the network server node comprising:

a processor; and a non-transitory computer readable medium including computer-executable instructions, that when executed by on the processor, carry out a method for configuring roaming handling by a visited wireless data network by user equipment affiliated with a home operator mobile wireless data network, the method comprising:

issuing, by the home roaming configuration server via a secure transmission path that connects the home operator mobile wireless data network and the visited operator mobile wireless data network, a configuration command specifying a configuration command affecting handling of roaming operation of user equipment of the home operator mobile wireless data network by the visited operator mobile wireless data network, wherein the configuration command causes the visited roaming configuration server to render a new roaming configuration for the visited operator mobile wireless data network handling of roaming wireless data network service usage by the home operator user equipment; and receiving, by home roaming configuration server from the visited roaming configuration server via the secure transmission path, a configuration acknowledgment message confirming the new roaming configuration for the visited operator mobile wireless data network.

13. The mobile wireless data network server node of claim 12 wherein the configuration command comprises a wholesale prepaid roaming configuration command that modifies one or more roaming wireless data network usage agreement terms for home operator user equipment.

14. The mobile wireless data network server node of claim 12 wherein the configuration command comprises a blocking command to block connection requests on the visited operator mobile wireless data network by home operator user equipment.

15. The mobile wireless data network server node of claim 12 wherein the configuration command comprises a firewall command to open a firewall on the visited operator mobile wireless data network that enables access by an identified requesting entity to data stored on an identified home operator user equipment.

16. A mobile wireless data network server node configured to operate as a visited operator roaming configuration server for a visited mobile wireless data network operator, the network server node comprising:
   a processor; and
   a non-transitory computer readable medium including computer-executable instructions, that when executed by on the processor, carry out a method for configuring roaming handling by a visited operator mobile wireless data network by user equipment affiliated with a home operator mobile wireless data network, the method comprising:
   receiving, by the visited roaming configuration server via a secure transmission path that connects the home operator mobile wireless data network and the visited operator mobile wireless data network, a configuration command specifying a configuration command affecting handling of roaming operation of user equipment of the home operator mobile wireless data network by the visited operator mobile wireless data network;
   executing, by the visited roaming configuration server, the configuration command to render a new roaming configuration for the visited operator mobile wireless data network handling of roaming wireless data network service usage by the home operator user equipment; and
   issuing, by the visited roaming configuration server via the secure transmission path, a configuration acknowledgment message confirming the new roaming configuration for the visited operator mobile wireless data network.

17. The mobile wireless data network server node of claim 16 wherein the configuration command comprises a wholesale prepaid roaming configuration command that modifies one or more roaming wireless data network usage agreement terms for home operator user equipment.

18. The mobile wireless data network server node of claim 16 wherein the configuration command comprises a blocking command to block connection requests on the visited operator mobile wireless data network by home operator user equipment.

19. The mobile wireless data network server node of claim 16 wherein the configuration command comprises a firewall command to open a firewall on the visited operator mobile wireless data network that enables access by an identified requesting entity to data stored on an identified home operator user equipment.

* * * * *